United States Patent [19]

Bell

[11] Patent Number: 4,779,404
[45] Date of Patent: Oct. 25, 1988

[54] SUCTION HARVESTER FOR AQUATIC PLANTS AND ANIMALS

[76] Inventor: John R. Bell, 27 Denning St., The Entrance, N.S.W. 2261, Australia

[21] Appl. No.: 923,824
[22] PCT Filed: Jan. 31, 1986
[86] PCT No.: PCT/AU86/00022
§ 371 Date: Sep. 18, 1986
§ 102(e) Date: Sep. 18, 1986
[87] PCT Pub. No.: WO86/04482
PCT Pub. Date: Aug. 14, 1986

[30] Foreign Application Priority Data

Jan. 31, 1985 [AU] Australia ............... PG9087

[51] Int. Cl.4 ........................... A01D 44/00
[52] U.S. Cl. ............................. 56/9; 37/59
[58] Field of Search ............ 56/8, 9; 37/58, 59

[56] References Cited

U.S. PATENT DOCUMENTS

| | | | |
|---|---|---|---|
| 968,356 | 8/1910 | Howe | 37/58 |
| 1,795,003 | 3/1931 | Allen | 56/9 |
| 2,204,584 | 6/1940 | Flower | 56/9 |
| 3,546,858 | 12/1970 | Chàplin | 56/9 |
| 3,653,192 | 5/1972 | Bryant | 56/9 |
| 3,691,737 | 9/1972 | Hodgson | 56/9 |
| 3,866,396 | 2/1975 | Meyer | 56/9 |
| 3,878,669 | 5/1975 | Chaplin | 56/9 |
| 3,884,018 | 5/1975 | Chaplin | 56/9 |
| 4,058,914 | 11/1977 | Kiss | 37/58 |
| 4,261,160 | 5/1981 | Niewiera | 56/8 |

Primary Examiner—John Weiss
Attorney, Agent, or Firm—Abelman Frayne Rezac & Schwab

[57] ABSTRACT

A suction harvester for aquatic plants and animals comprising a variable rate centrifugal pump capable of handling solids mounted on a vessel and connected to a manoeuvrable nozzle. The operator can control the placement of the nozzle and degree of suction applied by the pump to selectively harvest weed or algal mats, etc. from the bed of the water body. A location or manoeuvring system for the vessel in shallow water is also described, comprising spiked wheels driven by independent motors on the end of adjustable arms, the spikes engaging the bed of the water body for accurate location and propulsion with minimum disturbance.

9 Claims, 4 Drawing Sheets

SUCTION HARVESTER FOR AQUATIC PLANTS AND ANIMALS

TECHNICAL FIELD

This invention relates to a suction harvester for aquatic plants and animals and has been devised particularly though not solely for the control of nuisance aquatic plant or animal species.

BACKGROUND ART

In the past various types of aquatic harvesters or weed cutters have been provided, operating on a principle whereby aquatic plants are mechanically cut at the end of a moving conveyor belt which then carries the plants on board the harvester. Such harvesters have the disadvantage that the harvesting is not selective in that all material above the height of the cutting blades is removed. Such machinery is also of considerable weight, requiring a comparatively deep draught vessel in order to accommodate the machinery in a vessel of manoeuvrable proportions. This is a disadvantage with an aquatic harvester which is frequently required to operate in shallow water as aquatic plants are most prevalant in shallow water due to light penetration.

Some known aquatic harvesters are supported by wheels or tracks which run on the sea bed (or lake bed, etc.) to support the harvester, rather than being supported by a float vessel. Such land based machinery has the disadvantage that it can often cause ecological damage to the sea bed due to the disturbance caused by the wheels or tracks.

It is a further feature of known types of floating harvesters that they are normally powered by devices such as paddle wheels which are inefficient in their use of energy, and more importantly, provide no reference to the bottom of the water body. Drift due to wind and currents makes precise harvesting of an area difficult, if not impossible. Wheeled or tracked harvesting machinery provides good ground reference but causes considerable disturbance to the substrate and damage to the ecology of the aquatic environment.

It is therefore an object of the present invention to provide a suction harvester for aquatic plants and harvesters which will obviate or minimise the foregoing disadvantages in a simple yet effective manner, or which will at least provide the public with a useful choice.

DISCLOSURE OF INVENTION

Accordingly, in one aspect the invention consists in a method of harvesting aquatic plants and animals comprising the steps of:
(1) providing a vessel incorporating a manoeuvrable nozzle protruding therefrom connected to a pump arranged to suck water through the nozzle;
(2) manoeuvring the vessel and/or the nozzle to locate the nozzle in a position adjacent aquatic plants or animals desired to be harvested;
(3) operating the pump to suck water and entrained aquatic plants or animals through the nozzle; and
(4) discharging the water and entrained aquatic plants or animals from the pump to a desired discharge location.

Preferably the pump comprises a variable rate pump and the method includes selecting the flow rate of water through the pump to control the degree of suction applied to the nozzle.

Preferably the nozzle is manoeuvred through a controlled sweep pattern relative to the vessel during operation of the pump.

Preferably the vessel is manoeuvred in shallow water by controlled rotation of a plurality of wheels with radially extending spikes, the wheels having substantially horizontal axes and being mounted to the vessel such that the wheels may be raised or lowered to engage the ends of the lowermost spikes with the bed of the body of water in which the vessel is floating.

In a further aspect the invention consists in a harvester for aquatic plants and animals comprising a suport vessel, a manoeuvrable nozzle protruding from the vessel, and a pump arranged to suck water and entrained aquatic plants or animals through the nozzle and discharge them to a desired discharge location.

Preferably the nozzle forms the outer end of a nozzle arm extending radially outwardly from a substantially vertical pivot mounted on the vessel, and wherein actuation means are provided arranged to rotationally oscillate the nozzle arm about the pivot causing the nozzle to sweep back and forth through a predetermined arc.

Preferably the height of the nozzle arm is adjustable relative to the vessel.

Preferably the pump has a variable flow rate controlled by an operator of the harvester.

Preferably the pump is provided with an auxiliary priming pump arranged to supply water under pressure into the suction chamber of the main pump, the priming pump being operable on demand by an operator to back flush the nozzle and clear any blockage therein.

Preferably the vessel is provided with a plurality of wheels controllably rotatable by drive means about substantially horizontal axes, each wheel having a plurality of radially extending spikes and being mounted to the vessel such that the wheels may be raised or lowered to engage the ends of the lowermost spikes with the bed of the body of water in which the vessel is floating.

Preferably each wheel is mounted on the end of an arm attached to the vessel by way of a substantially horizontal pivot, each wheel being able to be raised or lowered by pivoting the arm relative to the vessel.

BRIEF DESCRIPTION OF DRAWINGS

Notwithstanding any other forms that may fall within its scope, one preferred form of the invention will now be described, by way of example only, with reference to the accompanying drawings, in which.

MODES FOR CARRYING OUT THE INVENTION

Figure 1:
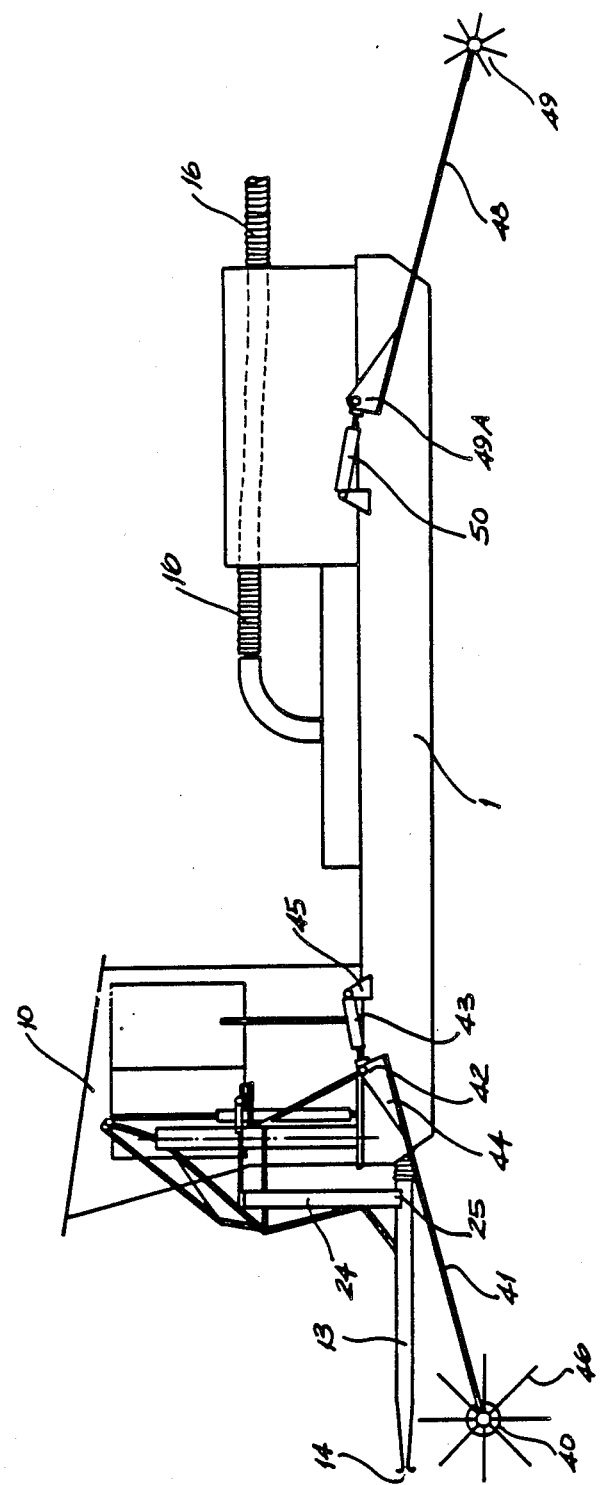
FIG. 1 is a diagrammatic side view of a suction harvester according to the invention.

In the preferred form of the invention a suction harvester for aquatic plants and/or animals is constructed as follows.

The harvester comprises a vessel of any convenient configuration but preferably in the form of a barge formed from two sealed pontoons (1) located either side of and secured to a central open-top barge (2) which is preferably of shorter length than the pontoons (1), leaving an area of open water between the pontoons at the front of the vessel. The central barge (2) is used to support and locate an engine (3) (preferably a diesel engine) coupled to hydraulic pumps (4) and (5). Also within the central barge (2) there is located a centrifugal pump (6) driven by way of a coupling (7) from a hydraulic motor (8) connected to and driven by the hydraulic pump (4) by way of hydraulic lines (9).

The hydraulic motor (8) is preferably a variable speed hydraulic motor controlled by suitable hydraulic valving (not shown) under the control of an operator from his position in a control cabin (10). The control cabin is preferably located at the front end of the vessel so that the operator has a good view of the suction nozzle (as described below).

The centrifugal pump (6) is preferably a high volume centrifugal pump capable of handling solid materials and is typically of the induced vortex type. When operating with certain aquatic materials it may be necessary to employ a mascerating impeller in the pump to cut entrained material to a size which will not bind the pump.

The inlet (11) to the pump (6) is connected by way of a flexible hose (12) to a hollow nozzle arm (13) which terminates at its forward end in a nozzle (14) protruding forwardly from the vessel. The outlet (15) from the pump (6) is also coupled to a flexible hose (16) for discharge of material from the pump to a desired discharge location.

A gland pump (17) is provided, driven by the motor (3), and arranged to pump water from an inlet immersed in a strainer (not shown) at the rear of the vessel to the bearing of the main pump (6).

The main pump (6) is primed by an auxiliary centrifugal priming pump (18) driven by a hydraulic motor (19) supplied with hydraulic fluid under pressure from the hydraulic pump (5) which is driven by the motor (3) and also used to provide hydraulic fluid under pressure to various hydraulic rams on the harvester as will be described further below. The auxiliary priming pump (18) draws water from an inlet immersed beneath the vessel and supplies that water under pressure through a conduit (20) by way of a non-return valve (21) into the inlet chamber of the main pump (6). In this way the auxiliary priming pump may be used to fill the inlet to the main pump (6) with water to prime the main pump prior to operation.

Figure 5:
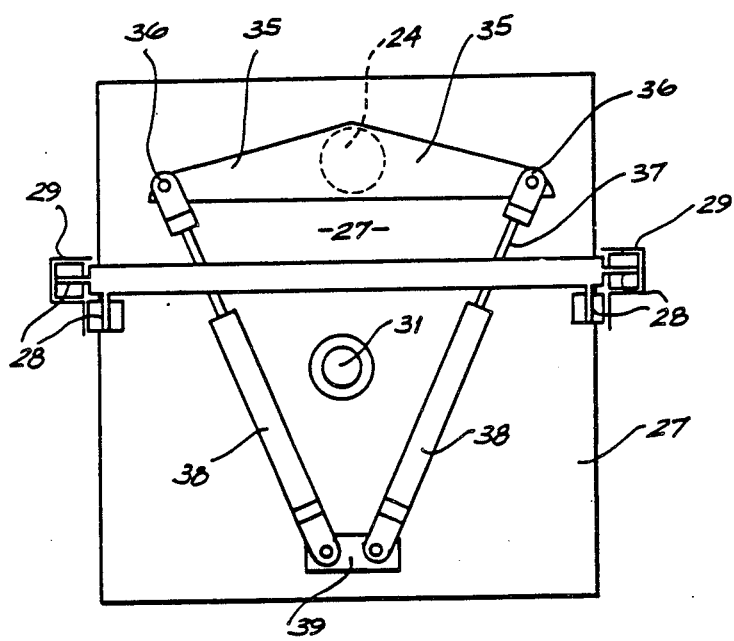
FIG. 5 is a plan view of the nozzle oscillation actuation mechanism shown in FIG. 4.
Figure 4:
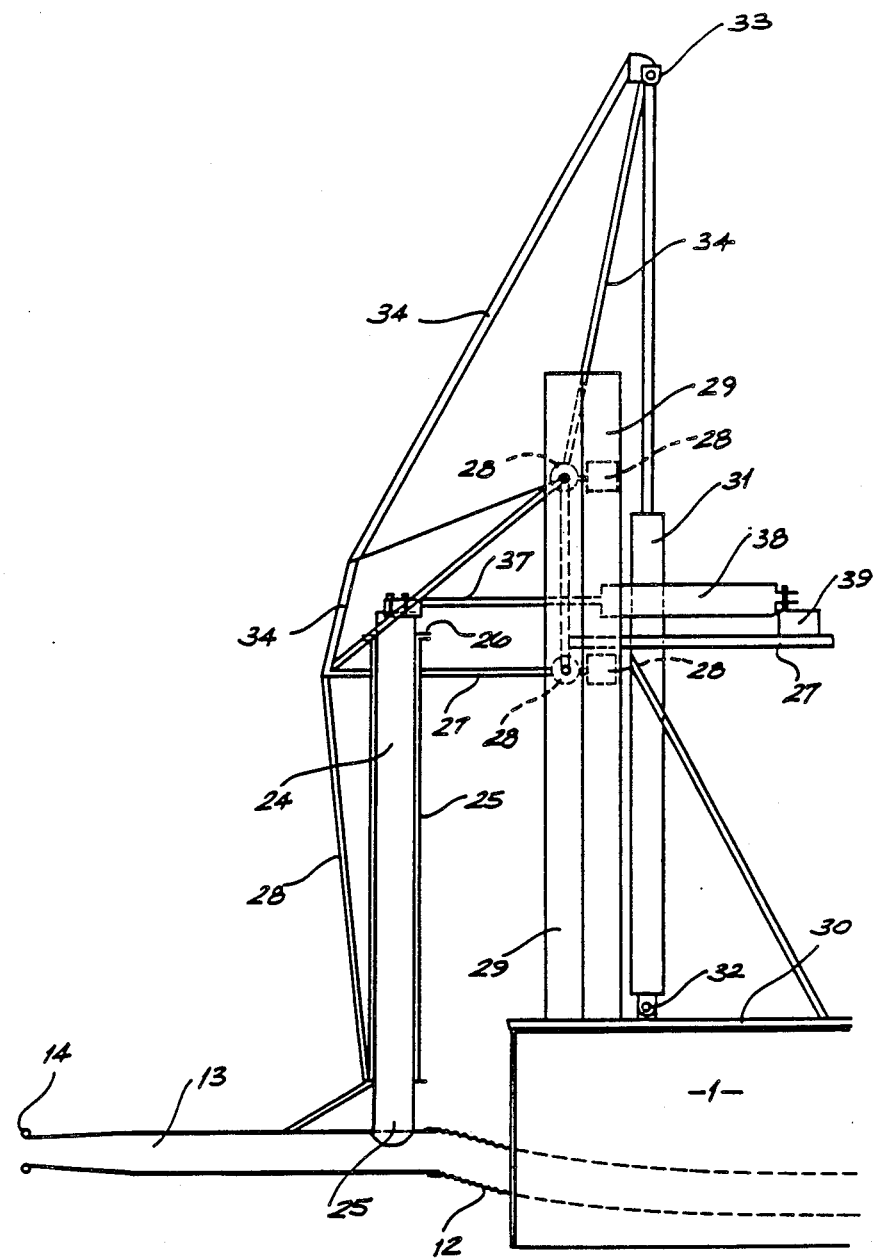
FIG. 4 is a side view to an enlarged scale of the nozzle actuation and control mechanism of the harvester shown in FIG. 1.

Reservoirs of hydraulic fluid and of fuel for the motor (3) may be conveniently located in tanks (22) and (23) located in the pontoons (1). The nozzle arm (13) is located and manoeuvred by an apparatus which will now be described with particular reference to FIGS. 4 and 5.

The nozzle arm (13) is supported by a vertical shaft (24) which is typically welded to the nozzle arm at point (25). As an optional feature the nozzle arm which is shown horizontally mounted in the attached drawings, may be secured to the vertical shaft (24) by way of a horizontal pivot, enabling the nozzle arm to be tilted downwardly to a predetermined inclination.

The vertical shaft (24) is located within a tube (25) and axially supported within the tube by way of a collar (26) so that the shaft protrudes from the top and bottom of the tube (25). The tube (25) is in turn located by a platform (27) and support bracing (28).

The platform (27) is in turn located by rollers (28) engaged with vertical columns (29) extending upwardly from a platform (30) located on the pontoons (1). The height of the platform (27) may be adjusted relative to the support platform (30) by moving the rollers (28) up and down within channels in the columns (29) under the control of a double acting hydraulic ram (31) secured at its lower end (32) to the platform (30) and having its upper end (33) connected to support struts (34) which in turn engage with and support the platform (27) and the vertical tube (25). In this manner the entire platform (27), the tube (25), shaft (24) and nozzle arm (13) may be moved vertically by operation of the hydraulic ram (31) supplied with hydraulic pressure from the pump (5) controlled by a valve operated by an operator in the cabin (10).

The nozzle arm (13) is caused to rotationally oscillate about the pivot formed by the vertical shaft (24) by way of an actuating mechanism comprising radial arms (35) (FIG. 5) extending outwardly from the shaft (24) and connected at their outer ends to yokes (36) connected in turn of the actuating rods (37) of hydraulic rams (38), anchored at their opposite ends to a support bracket (39) on the platform (27). The hydraulic rams (38) are operated by hydraulic fluid supplied from the pump (5) through a pressure operated hydraulic pilot valve, activated automatically at the end of each sweep of the nozzle arm (13), reversing the flow of hydraulic oil through the rams (38) and consequently the direction of oscillation of the nozzle arm (13). The sweep speed is controllable by a valve in the operator's cabin (10) and the length of the sweep is adjustable by altering the distance along the radial arms (34) and (35) at which the yokes (36) are located.

In this manner the nozzle arm (13) may be caused to oscillate about the pivot of the shaft (24) through a predetermined arc at a speed controlled by the operator, while the height of the nozzle arm and hence of the nozzle (14) may also be controlled by the operator by way of hydraulic ram (31).

Figure 2:
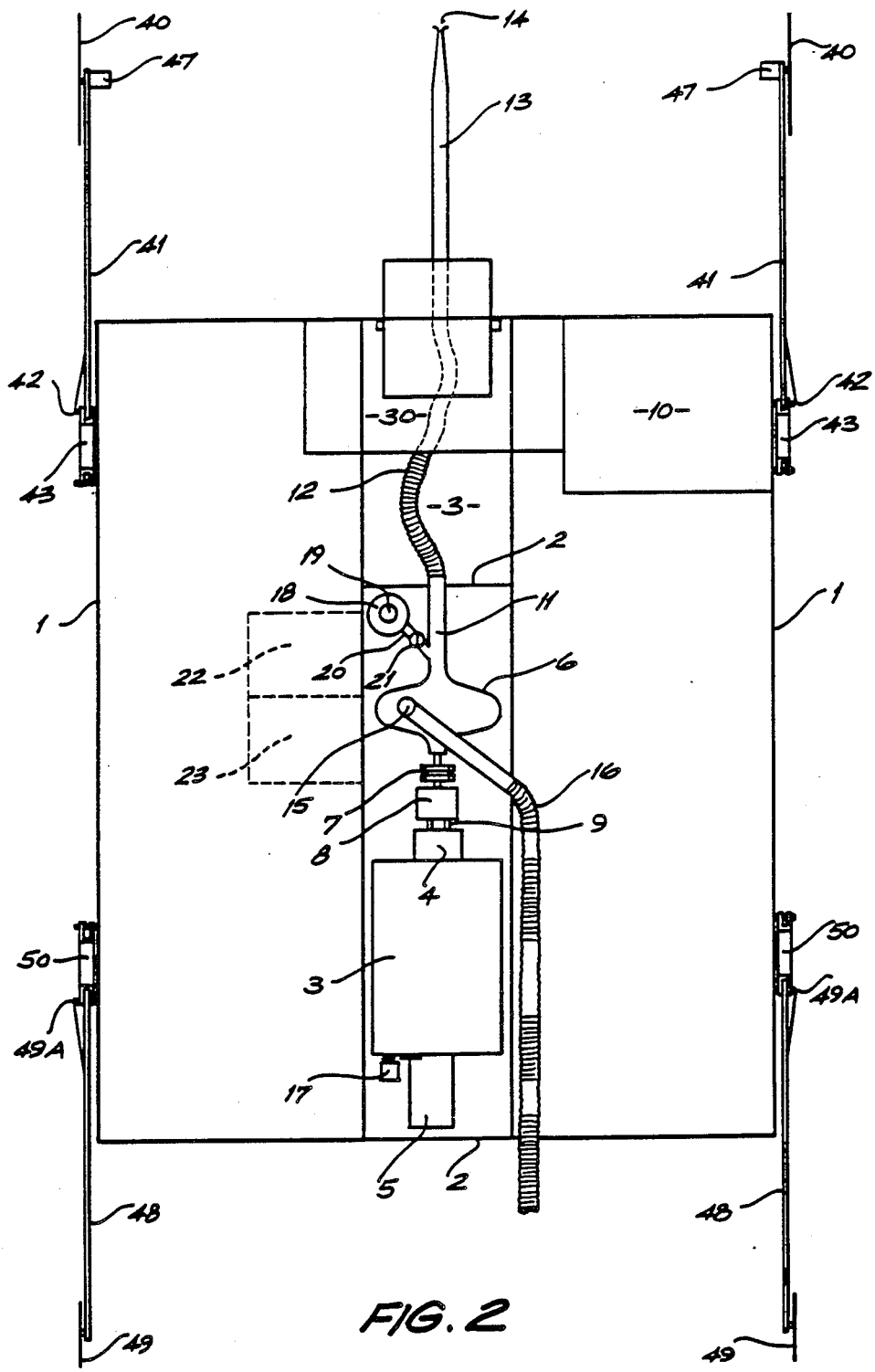
FIG. 2 is a diagrammatic plan view of the harvester shown in FIG. 1.
Figure 3:
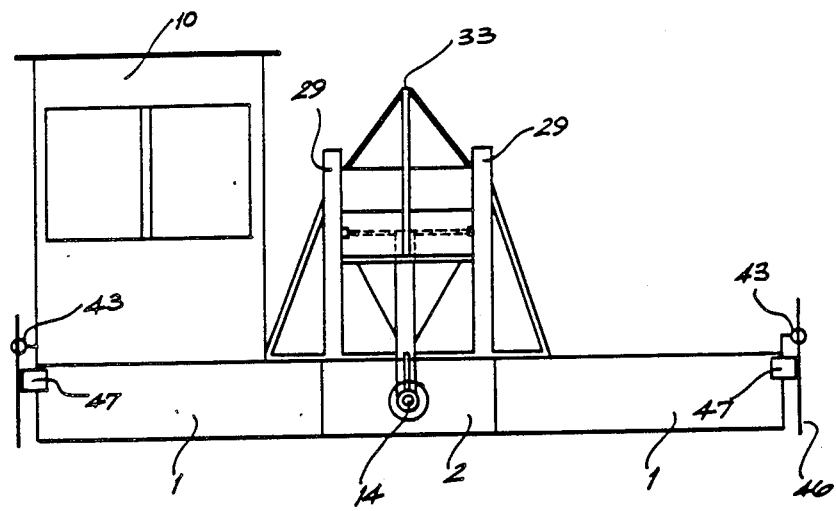
FIG. 3 is a diagrammatic frontal view of the harvester shown in FIG. 1.

The vessel may be propelled in deep water by any suitable propulsion means such as an outboard motor or a drive leg powered directed or indirectly by the motor (3), or alternatively may be towed to a desired shallow water location for operation. Once in the shallow water location the vessel is positioned and manoeuvred by way of wheels (40) having horizontal axes and mounted on the ends of arms (41) pivotally mounted to the sides of the pontoons (1) by way of horizontal pivot pins (42) and rotatable thereabout by hydraulic rams (43) operable between trunions (44) on the arms (41) and support lugs (45) attached to the pontoon. Operation of the hydraulic rams (43) causes the arms (41) to rotate and hence raise or lower the wheels (40) relative to the vessel. In the preferred form of the invention two such sets of wheels and arms are provided located on either side of the vessel and protruding forwardly therefrom as shown in FIGS. 1 and 2.

Each wheel (40) is provided with radially extending spikes (46) which can engage with the sea bed (or the bed of any other water body in which the water is floating) upon lowering of the arm to a desired depth. Each wheel is provided with a hydraulic drive motor (47) able to rotate the wheel when powered by hydraulic fluid supplied under pressure from the pump (5) by way of control valves in the operator's cabin (10). By operating those control valves the operator can independently rotate each of the drive motors (47) at a desired speed and hence cause each spiked wheel to move forwardly or backwardly propelling or manoeuvring the vessel to a desired location. The two drive motors (47) may of course be operated independently, e.g. one forward and one in reverse, to cause the vessel to turn in a desired manner.

Where required for further location of the vessel a further pair of arms (48) may also be provided at the rear of the vessel pivotally mounted to the pontoons by way of pivots (49A) controlled by hydraulic rams (50) in a similar manner to the arms (41), pivots (42) and hydraulic rams (43), respectively. The arms (48) are also provided with spiked wheels (49) which are free to free-wheel on the ends of the arms (48) and are not provided with hydraulic drive motors.

In use the harvester is positioned in a location where it is desired to harvest aquatic plants or animals whereupon the vessel may be manoeuvred into a desired location and held in that location by engaging the spiked wheels (40) and (49) with the sea bed and manipulating the hydraulic motors (47) accordingly. The pump (6) may then be driven at a desired speed by the hydraulic motor (8) causing water to be sucked into the pump from the nozzle (14) and discharged through the outlet hose (16). The nozzle (14) is vertically positioned by the operator by way of the hydraulic ram (31) so as to locate the nozzle at the desired depth and the nozzle is then oscillated over a predetermined sweep path by operation of the hydraulic rams (38). The operator in the cabin (10) may control the sweep rate of the nozzle, and the degree of suction applied by the pump (6) so as to achieve the desired harvesting effect which may vary depending on the location and the plant or animal which it is desired to harvest. The direct suction principle allows the force applied to the material to be harvested to be altered by adjusting pump speed and the operating depth of the nozzle in the water column. In this way a range of harvesting functions is made possible. For example, management plans may require the total clearing of an area for recreational purposes, or the removal of floating algal mats to visually enhance an area, or the removal of entangled algi and dead plant material from a seagrass bed to improve light penetration. The ability of this harvester to remove material selectively has important implications, particularly in ecologically sensitive areas.

Because the machinery used in the harvester according to the invention is comparatively light in weight, it is possible to mount the harvester in a shallow draught barge formed from the pontoons (1) and (2) so as to be operable in shallow water. As light penetration is a major factor in limiting the depth of water in which aquatic plants will grow, the ability of the harvester to operate in very shallow waters is important. With the bouyancy provided by the two pontoons (1) and the smaller central barge (2), the suction harvester of the type shown in the drawings draws approximately 175 mm fully laden and its moving nozzle (14) is capable of harvesting in less than 300 mm of water without entraining significant amounts of air from the surface. The operating depth could be further reduced by providing a sheild over the nozzle (14) to inhibit vortex action. The shallow draught capability of the harvester according to the invention significantly increases the area of a shallow water body over which the harvester can operate and so reduces the need for, and the ecological damage caused by, land based machinery used in an aquatic environment.

It is a further feature of the harvester according to the invention that the water and aquatic material is passed through the main pump (6) and discharged through the flexible hose (16) which can deliver to any desired location. Such locations could typically be:

(a) to a mesh separator basket situated on the harvester;

(b) to a mesh separator basket on a transporter pontoon;

(c) directly over the side of the vessel should disruption of algal beds be the prime objective; or (d) to a buoyed delivery hose to pump materials to the shore.

It is a further feature of the harvester according to the invention that the propulsion and manoeuvring system provided by the spiked wheels (40) and (49) provides good ground reference and so makes accurate harvesting possible. Little energy is required to propel the vessel by this method and disturbance to the substrate and ecology is kept to a minimum. It is also possible to control the location of the vessel accurately against drift due to wind and currents.

It is a further feature of the invention that the auxiliary priming pump (18) may be used during operation to clear any blockage that may occur in the nozzle (14). Should such a blockage occur the operator can simply stop the pump (6) by operating the control valve to the hydraulic motor (8), and then activate the priming pump (18) by way of hydraulic motor (19) causing excess priming water to back flow through the nozzle (14) and force any blockage from the nozzle end.

I claim:

1. A method of harvesting aquatic plants comprising the steps of:

providing a vessel incorporating a maneuvrable nozzle protruding therefrom connected to a pump arranged to suck water through the nozzle;

maneuvring the nozzle relative to the vessel by sweeping the nozzle from side to side in a controlled sweep pattern adjacent aquatic plants;

operating the pump to suck water and entrained aquatic plants through the nozzle; and discharging the water and entrained aquatic plants from the pump to a desired discharge location.

2. A method of harvesting aquatic plants as claimed in claim 1, wherein the pump comprises a variable rate pump and the method includes selecting the flow rate of water through the pump to control the degree of suction applied to the nozzle.

3. A method of harvesting aquatic plants comprising the steps of:

providing a vessel incorporating a maneuvrable nozzle protruding therefrom connected to a pump arranged to suck water through the nozzle;

maneuvring the nozzle relative to the vessel by sweeping the nozzle from side to side in a controlled sweep pattern adjacent aquatic plants;

operating the pump to suck water and entrained aquatic plants through the nozzle;

discharging the water and entrained aquatic plants from the pump to a desired discharge location; and maneuvering the vessel in shallow water by controlled rotation of a plurality of wheels with radially extending spikes, the wheels having substantially horizontal axes and being mounted to the vessel such that the wheels may be raised or lowered to engage the ends of the lowermost spikes with the bed of the body of water in which the vessel is floating.

4. A harvester for aquatic plants comprising a support vessel, a maneuvrable nozzle protruding from the vessel and arranged to sweep from side to side relative to the vessel, and a pump arranged to suck water and entrained aquatic plants through the nozzle and discharge them to a desired discharge location.

5. A harvester as claimed in claim 4, wherein the nozzle forms the outer end of a nozzle arm extending radially outwardly from a substantially vertical pivot mounted on the vessel, and wherein actuation means are provided arranged to rotationally oscillate the nozzle arm about the pivot causing the nozzle to sweep back and forth through a predetermined arc.

6. A harvester as claimed in claim 5, wherein the height of the nozzle arm is adjustable relative to the vessel.

7. A harvester as claimed in claim 4, wherein the pump has a variable flow rate controllable by an operator.

8. A harvester for aquatic plants comprising a support vessel, a maneuvrable nozzle protruding from the vessel and arranged to sweep from side to side relative to the vessel, and a pump arranged to suck water and entrained aquatic plants through the nozzle and discharge them to a desired discharge location wherein the vessel is provided with a plurality of wheels controllably rotatable by drive means about substantially horizontal axes, each wheel having a plurality of radially extending spikes and being mounted to the vessel such that the wheels may be raised or lowered to engage the ends of the lowermost spikes with the bed of the body of water in which the vessel is floating.

9. A harvester as claimed in claim 8, wherein each wheel is mounted on the end of an arm attached to the vessel by way of a substantially horizontal pivot and wherein the wheel is able to be raised or lowered by pivoting the arm relative to the vessel.

* * * * *